US006367748B1

United States Patent
Solomon et al.

(10) Patent No.: US 6,367,748 B1
(45) Date of Patent: Apr. 9, 2002

(54) APPARATUS FOR PROVIDING DESKTOP MOBILITY FOR DESKTOP ELECTRONIC DEVICES

(75) Inventors: Gary B Solomon, Dallas, TX (US); Mark B Solomon, Norwood, MA (US)

(73) Assignee: SolVisions Technologies Int'l, Norwood, MA (US)

( * ) Notice: Subject to any disclaimer, the term of this patent is extended or adjusted under 35 U.S.C. 154(b) by 0 days.

(21) Appl. No.: 09/503,066

(22) Filed: Feb. 12, 2000

(51) Int. Cl.$^7$ ................................................. A47K 1/04
(52) U.S. Cl. ................... 248/129; 248/346.11; 248/919
(58) Field of Search ....................... 248/346.03, 346.11, 248/346.01, 349, 918, 917, 646, 919

(56) References Cited

U.S. PATENT DOCUMENTS

| 2,306,209 A | | 12/1942 | Elofson et al. | |
| 2,311,928 A | * | 2/1943 | Buehler | ................... 248/129 X |
| 4,190,303 A | | 2/1980 | Ellis | |

(List continued on next page.)

FOREIGN PATENT DOCUMENTS

| JP | 08125952 | 5/1996 |
| JP | 08134570 | 11/1996 |
| JP | 11069536 | 3/1999 |
| JP | 11137343 | 5/1999 |
| JP | 11262415 | 9/1999 |
| JP | 11306584 | 11/1999 |
| WO | WO 99/55196 | 11/1999 |
| WO | WO 00/45011 | 8/2000 |

OTHER PUBLICATIONS

Compaq, "Hear That Humming? That's The Sound of Your Business", eWeek, Jun. 5, 2000, vol. 17, No. 23.
Reid Tool Supply Company, Catalog, 2000.

*Primary Examiner*—Ramon O. Ramirez

(57) ABSTRACT

Desktop mobility is provided for a desktop electronic device by at least one mobility assembly to translate the desktop electronic device from a first position to a second position on a desktop. The mobility assembly(s) may be integral with a housing of the desktop electronic device, connected to the desktop electronic device, or combined with a platform used to provide mobility for the desktop electronic device. The mobility assembly(s) include at least one primary revolving member and at least three secondary revolving members in contact therewith, The primary and secondary revolving members may be spherically or cylindrically shaped, independently. The mobility assembly(s) may be selectably engaged with and disengaged from the desktop. Additionally, various braking mechanisms may be selectably applied to restrict movement of the desktop electronic device. A means for securing the desktop electronic device may be connected to the platform to reduce risk of the desktop electronic device from falling off the platform.

44 Claims, 6 Drawing Sheets

U.S. PATENT DOCUMENTS

| | | | |
|---|---|---|---|
| 4,561,619 A | * 12/1985 | Robillard et al. | 248/918 X |
| 4,615,502 A | * 10/1986 | McLaughlin | 248/918 X |
| 4,624,510 A | 11/1986 | Jedziniak | |
| 4,681,378 A | 7/1987 | Hellman, III | |
| 4,696,522 A | 9/1987 | Lowe | |
| 4,709,972 A | 12/1987 | LaBudde et al. | |
| 4,783,879 A | 11/1988 | Weaver | |
| 4,828,342 A | 5/1989 | Stefan | |
| 4,844,387 A | 7/1989 | Sorgi et al. | |
| 4,901,972 A | 2/1990 | Judd et al. | |
| 4,925,240 A | 5/1990 | Peters | |
| 4,989,291 A | 2/1991 | Parent | |
| 5,080,236 A | 1/1992 | Conner | |
| 5,199,360 A | 4/1993 | Koistinen | |
| 5,263,678 A | 11/1993 | Birkbeck | |
| 5,276,524 A | 1/1994 | Inoue et al. | |
| 5,355,146 A | 10/1994 | Chiu et al. | |
| 5,470,041 A | 11/1995 | Cucinotta | |
| 5,557,186 A | 9/1996 | McMurtrey | |
| 5,572,935 A | 11/1996 | Schairbaum | |
| 5,584,546 A | 12/1996 | Gurin et al. | |
| 5,595,074 A | 1/1997 | Munro | |
| 5,630,566 A | 5/1997 | Case | |
| 5,667,207 A | 9/1997 | Pistole | |
| 5,683,064 A | 11/1997 | Copeland et al. | |
| 5,725,189 A | * 3/1998 | Landy | 248/346.03 |
| 5,758,935 A | 6/1998 | Coonan | |
| 5,835,342 A | 11/1998 | Hunte | |
| 5,867,369 A | 2/1999 | Antonuccio et al. | |
| 5,900,708 A | 5/1999 | Den Engelse et al. | |
| 5,927,669 A | * 7/1999 | Sassman | 248/346.01 |
| 5,947,570 A | 9/1999 | Anderson et al. | |
| 5,961,134 A | 10/1999 | Congleton et al. | |
| 5,961,192 A | 10/1999 | Bernart et al. | |
| 5,980,008 A | 11/1999 | Stoever | |
| 6,027,090 A | 2/2000 | Liu | |
| 6,036,288 A | 3/2000 | Shih | |
| 6,086,315 A | 7/2000 | Poindexter et al. | |
| 6,099,093 A | 8/2000 | Spence | |
| 6,179,264 B1 | * 1/2001 | Moy et al. | 248/349.1 |

* cited by examiner

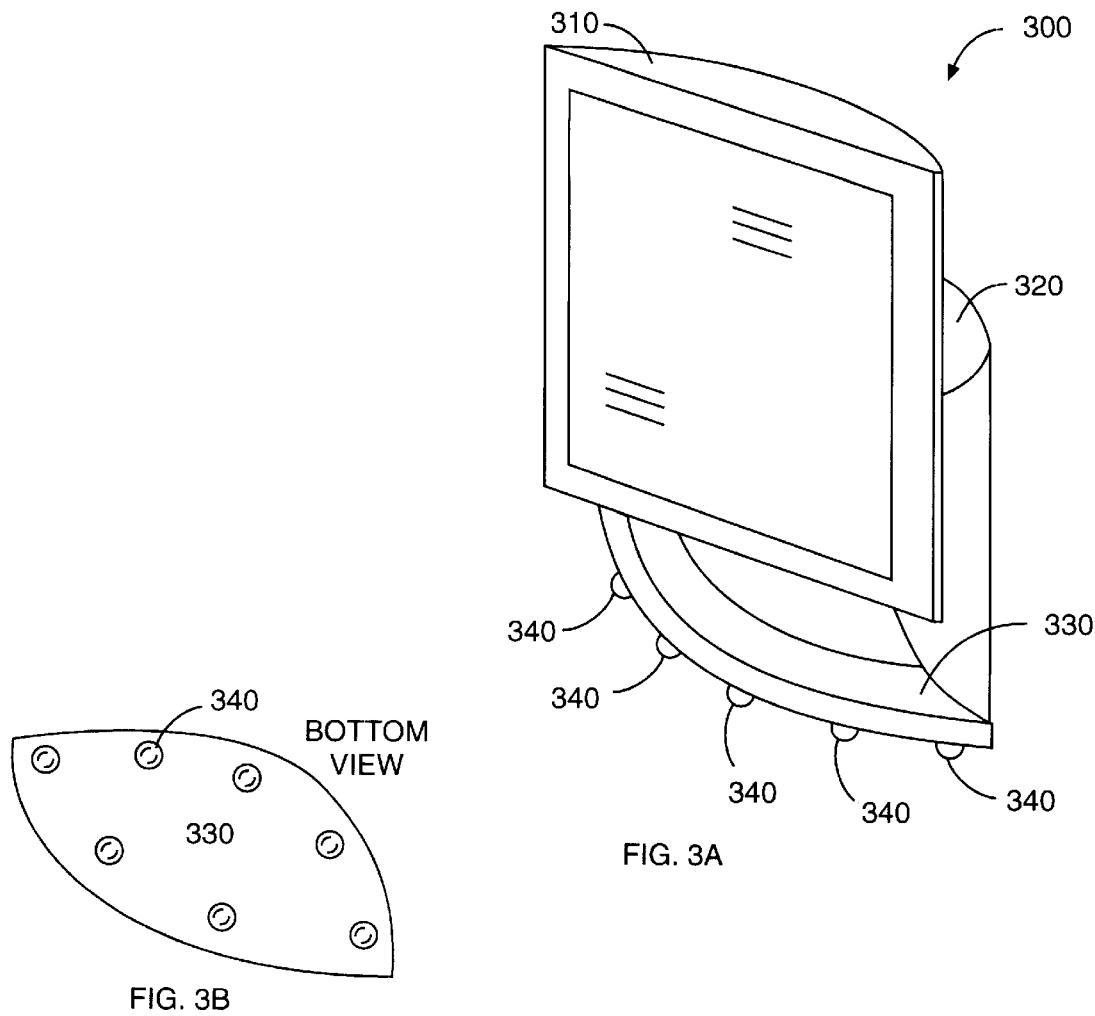
FIG. 3A
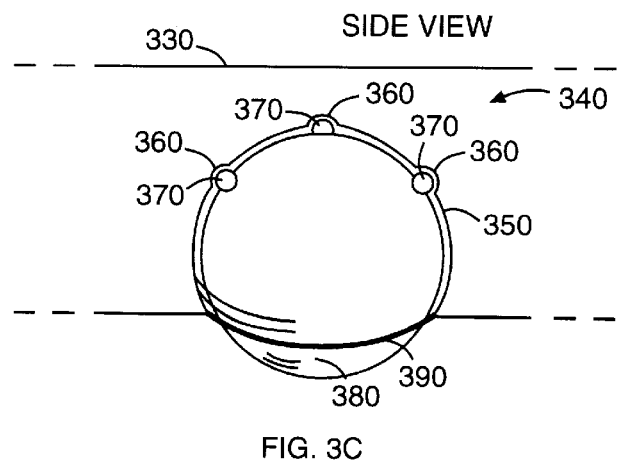
FIG. 3B
FIG. 3C

FRONT VIEW

BOTTOM VIEW

APPARATUS FOR PROVIDING DESKTOP MOBILITY FOR DESKTOP ELECTRONIC DEVICES

BACKGROUND OF THE PRESENT INVENTION

Desktop electronic devices, such as computers, computer monitors, keyboards, or multi-component units, have become necessary in places of employment and a convenience at home. The desktop electronic devices have made workforces around the world more efficient and productive. However, as desktop electronic devices have become an essential tool to office workers or deskworkers, premium desktop space has been sacrificed to support the desktop electronic devices.

A problem that has arisen due to the desktop electronic devices requiring desktop space is that the deskworker has difficulty finding available desktop space to perform traditional paperwork duties. To accommodate space for the desktop electronic devices and the traditional paperwork duties, businesses have had to resort to purchasing additional furniture for the deskworkers, including tables, desks, and chairs. The additional furniture is costly and, more important, requires additional office space for each deskworker.

Typically, the desktop electronic device resides directly on the desk, which is the most physically convenient location for the deskworker to use for operating the desktop electronic device. If the deskworker has a single desktop, then the deskworker has two alternatives to perform traditional paperwork duties: (i) either sit uncomfortably to perform paperwork duties around the desktop electronic device, or (ii) physically pick up or slide the desktop electronic device across the workspace to make usable space available. A deskworker who sits uncomfortably for long periods of time can expect physical ailments, and a deskworker who physically lifts or slides the desktop electronic device may eventually experience physical injury. Furthermore, sliding the desktop electronic device across the desktop on the base of the desktop electronic device can scratch or damage the desktop and/or damage the desktop electronic device.

Alternatively, businesses may purchase other mechanisms for the desktop electronic devices to be supported above the desktop. FIG. 1 shows a desktop electronic device 100 supported above a desk 110 by a swing arm 120. The swing arm 120 allows the desktop electronic device 100 to be moved out of the deskworker's way without lifting or sliding the device. The swing arm 120, however, is relatively bulky, heavy, and expensive for supporting the weight of the desktop electronic device 100. Less appealing is the requirement that the swing arm 120 be fixedly attached to the desk 110, potentially damaging or scratching the desk 110. Similar problems exist at a home of an individual who owns a desktop electronic device.

SUMMARY OF THE INVENTION

The present invention provides desktop mobility for desktop electronic devices by connecting at least one mobility assembly to the desktop electronic device. The mobility assembly(s) allow the deskworker to roll the desktop electronic device to an out-of-the-way location on the desktop so that the deskworker can perform his or her paperwork duties. The mobility assembly(s) may be connected to the desktop electronic device during manufacturing as original equipment of manufacture (OEM). Each mobility assembly includes at least one revolving member being shaped as a sphere or cylinder. To grip and reduce scratching the desktop, the revolving member(s) that touch the desktop are optionally coated or are made of a solid material, such as rubber.

Alternatively, at least one mobility assembly may be connected to a separate platform used to support and provide desktop mobility to the desktop electronic device. The platform optionally includes means for securing the desktop electronic device to the platform to reduce risk of the desktop electronic device from falling off the platform during movement. The mobility assembly(s) may be engaged and disengaged from the desktop for both the separate platform and device integrated OEM designs.

Additionally, the present invention teaches an apparatus for providing mobility to a desktop electronic device. The apparatus includes a primary revolving member located within a primary cavity, and at least three secondary revolving members located within at least one secondary cavity extending from the primary cavity. The secondary revolving members contact the primary revolving member, thereby allowing the primary revolving member to rotate 360 degrees.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 3A is a schematic diagram of a desktop electronic device of FIG. 2 having a flat panel display connected directly to the computing device having at least one mobility assembly incorporated in the device base;

FIG. 3B is an illustration of the device base of FIG. 3A;

FIG. 3C is a schematic diagram of the mobility assembly utilized in the desktop electronic device of FIG. 3A;

DETAILED DESCRIPTION OF THE PRESENTLY PREFERRED EXEMPLARY EMBODIMENTS

The present invention will now be described more fully hereinafter with reference to the accompanying drawings, in which preferred embodiments of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Deskworkers who use desktop electronic devices, such as computers, find that their desktops are consumed by desktop electronic devices, leaving little desktop space for traditional paperwork duties. While computer manufacturers have begun to combat the desktop space issue by producing computers with flat panel displays, the deskworker still faces the problem of having to work around the desktop electronic device that is, typically and desirably, located in the center of the desktop while being used. The present invention addresses this same desktop space issue, but from the standpoint of facilitating movement of the desktop electronic device, and does so by coupling at least one mobility member to the desktop electronic device. With the aid of the mobility assembly, the deskworker has an easy way to roll the desktop electronic device to an end or back of the desktop. Thus, the deskworker re-gains valuable desktop space to perform paperwork without lifting or damaging the desktop electronic device(s). Additionally, the need for an employer to purchase additional desks for deskworkers is reduced due to the ease in moving the desktop electronic devices across the desktop, which effectively provides for additional desktop space.

Figure 1:
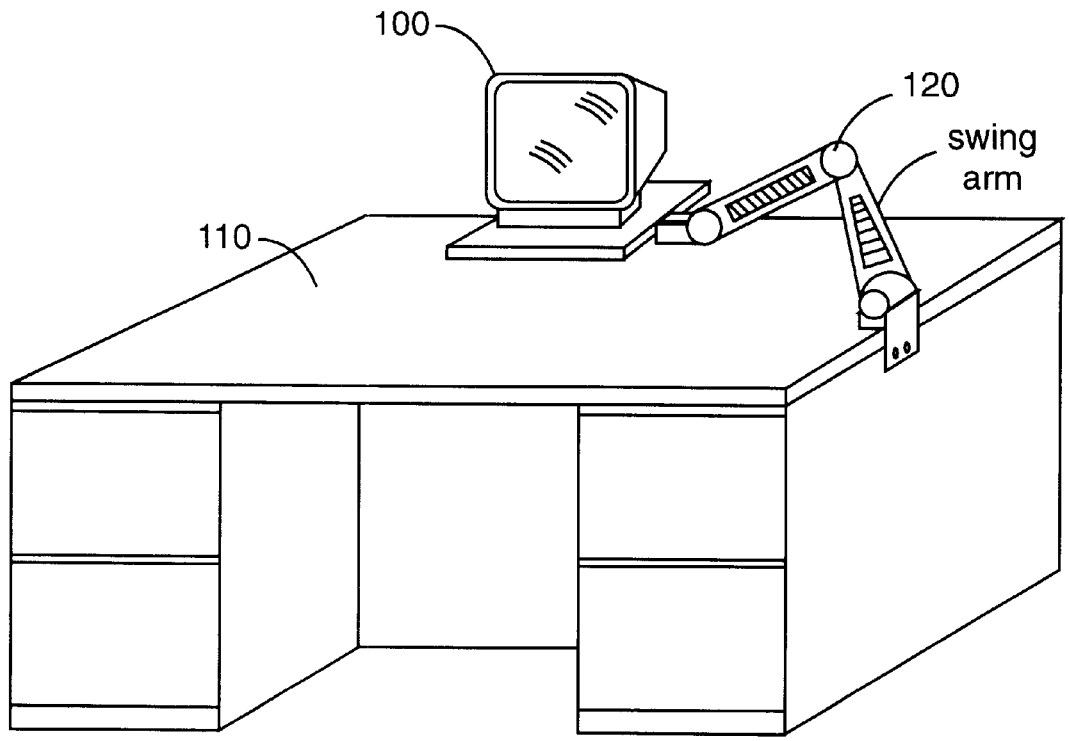
FIG. 1 is an illustration of a representative workspace for a deskworker having a desktop electronic device mounted on a prior art swing arm unit, as previously described.
Figure 2:
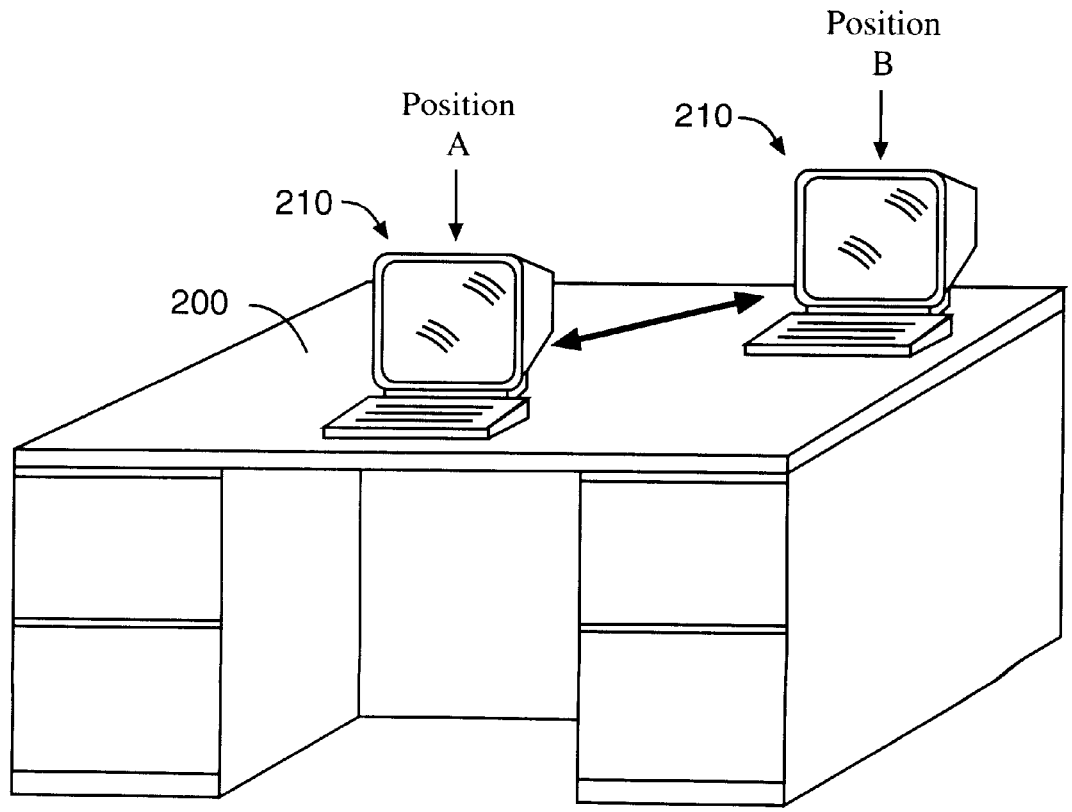
FIG. 2 is an illustration of a representative workspace for a deskworker indicating usage and non-usage desktop locations for the desktop electronic device.

FIG. 2 is a typical desktop 200 work environment. Typically, the deskworker positions the desktop electronic devices 210, here a computer chassis with a computer monitor positioned on the computer chassis, at Position A. Though convenient for computer-related tasks, when in Position A, the desktop electronic device 210 is inconvenient for performing traditional paperwork tasks. The deskworker translates the desktop electronic device 210 across the desktop to Position B. The deskworker would benefit greatly if the desktop electronic device 210 could be easily moved into an out-of-the-way position on the desktop 200, such as is shown with the desktop electronic device 210 in Position B.

The present invention provides the deskworker with a simple, low-profile, small-footprint, non-desk altering solution to easily move the desktop electronic devices about the desktop, for example, from front-center (Position A) to far-right (position B). Of course, the present invention is adaptable to other desktop electronic devices, such as portable computers, network appliances, stereos, adding machines, cash registers, televisions, etc. Since desktop computers are most common in a typical desktop work environment, it is used here as the example desktop electronic device.

FIG. 3A depicts a specific type of desktop electronic device, commonly known as anintegrated computer 300. The desktop electronic device 300 incorporates a flat panel display 310, housing 320 and base 330 into a single form. The flat panel display 310 is coupled to the housing 320, which contains the computer electronics. The housing 320 is supported by the base 330. The desktop electronic device 300 (i.e., integrated computer) is manufactured with the flat panel display so as to reduce size, weight, and footprint. Even so, however, as with traditional, non-integrated computers and display monitors (see, for example, the computer 210, FIG. 2), the deskworker preferably positions the desktop electronic device 300 directly in the front and center of the desktop, thereby resulting in the same problem of not having desktop space or having to move the desktop electronic device 300 to perform traditional paperwork duties.

Because the desktop electronic device 300 is smaller and lighter than traditional desktop electronic devices having larger monitors (e.g., 210), the deskworker can more easily slide the desktop electronic device 300 on its base 330 across the desktop or pick up the desktop electronic device 300 and place it out of the way (i.e., on another location on the desktop). However, each of these options subjects the desktop and desktop electronic device 300 to damage, and the deskworker to injury.

To reduces risk of damage and injury, mobility assemblies 340 are connected to the base 330 of the desktop electronic device 300. These mobility assemblies 340 support and provide mobility for the desktop electronic device 300.

It should be understood that the mobility assemblies 340 solve the above problems for moving the desktop electronic device and provide the following benefits. First, the desktop electronic device can be rolled rather than slid across the desktop, preventing damage to the desktop and reducing the likelihood of tipping the desktop electronic device. Second, the deskworker does not have to lift the desktop electronic device, thus avoiding risk of physical injury to the deskworker. Third, the desktop electronic device is protected from being dropped or jarred during operation.

FIG. 3B shows a bottom view of the base 330 of the desktop electronic device 300. Shown connected to the base 330 are a plurality of mobility assemblies 340. These mobility assemblies 340, as shown, are integrally manufactured within the base 330 so as to be original equipment of manufacture (OEM). A manufacturer of desktop electronic devices 300 that integrates the mobility assemblies 340 directly into the base removes the need for later assembly by the deskworker. It should be understood that the number of mobility assemblies 340 shown are merely representative of one embodiment, and that as few as one and as many as desired (i.e., fit into the footprint of the base 330) could be implemented. Additionally, each mobility assembly 340 includes at least one revolving element, where the size and shape of the revolving element can vary, where shapes include at least spherically and cylindrically revolving elements. Also, cylindrically shaped wheels mounted on castors (not shown), as is well known in the art, could be used to allow the cylindrically shaped wheels to move the desktop electronic device multi-directionally.

FIG. 3C shows a side view of the mobility assembly 340 according to the present invention. As shown, the base 330, which could also be a separate platform as is further described in reference to FIG. 8, houses the mobility assembly 340. In one embodiment, the base 330 comprises a first or primary cavity 350, which is spherically shaped, and three secondary cavities 360, also defining spherical shapes. The secondary cavities 360 each have an opening so that a secondary revolving element 370 deployed in a secondary cavity 360 touches a first or primary revolving element 380, deployed in the primary cavity 350.

The primary cavity 350 has an opening at the bottom of the base 330 so that the primary revolving element 380 can touch the desktop, thereby supporting the flat surface of the base 330 off the desktop. The extent to which the primary revolving element 380 extends below the opening at the bottom of the base 330 may be dependent upon the weight of the desktop electronic device or simply for aesthetic purposes. The primary revolving element 380 is preferably larger than the three secondary revolving elements 370, but may be smaller or the same size. The three secondary revolving elements 370 may be positioned 60 degrees apart from one another and above the "equator" of the primary revolving element 380. Alternatively, more than three secondary revolving elements 370 are configured around the primary revolving element 380, possibly at random locations in the primary cavity 350 and possibly in one or more secondary cavities 360 that support more than just one secondary revolving element 370. Another embodiment employs secondary cylinders, rather than secondary spheres, to contact the primary revolving element 380. The cylinders may reside in a cylindrical cavity or be mounted on support pins.

By configuring the primary revolving element 380 to press against the three secondary revolving elements 370 that are housed in their own secondary cavities 360, the primary revolving element 380 is free to rotate any number of degrees in any direction with very little resistance. This is so because the primary revolving element 380 does not contact the primary cavity 350 wall; it is kept a small distance from the wall by the secondary revolving elements 370.

So that the primary revolving element 380 grips the desktop well and reduces likelihood of scratching the desktop, the composition of the primary revolving element 380 may comprise an outer layer of rubber or be formed of solid rubber, or other soft material relative to a desktop, while having a reasonable coefficient of restitution to prevent deformation over time. Other materials capable of providing gripping without scratching for the primary revolving element 380 and allowing the primary revolving element 380 to revolve with little resistance by the three secondary revolving elements 370 are suitable to be used. Additionally, so that the primary revolving element 380 is able to freely rotate, the composition of the outer layer of three secondary revolving elements 370 is Teflon as is each secondary cavity 350 wall so as to provide a low coefficient of friction so that each secondary revolving element 370 is more easily able to rotate within each secondary cavity 350. Other material having a very low coefficient of resistance, such as metal or plastic, could also be used. However, the high coefficient of friction of the primary revolving element provides enough friction with the secondary revolving elements 370 (and the desktop) to allow the primary revolving element 380 and secondary revolving elements 370 to revolve in their respective cavities 350, 360. Note that the revolving of the secondary revolving elements 370 is optional as limited contact between the primary 380 and secondary 370 revolving elements allows the mobility assembly 340 to provide desktop mobility to the desktop electronic device 300.

A retainer ring 390 connected to the base 330 by a screw design (not shown) or other retaining method, such as a latching mechanism, prevents the revolving elements 370 and 380 from falling out of the primary cavity 350 when lifted from the desktop. The retainer ring 390 is removable to allow the deskworker to access to the mobility assembly 340 to repair damaged or dirty revolving elements 370, 380 or cavities 350, 360.

It should be understood that the mobility assembly 340 can be configured differently from the embodiment described to secure to other, electronic or non-electronic, devices. Additionally, the mobility assembly 340 and its components can be scaled to be any size (i.e., larger or smaller) so as to be properly sized to support the device to which the mobility assembly 340 is attached.

Figure 4:
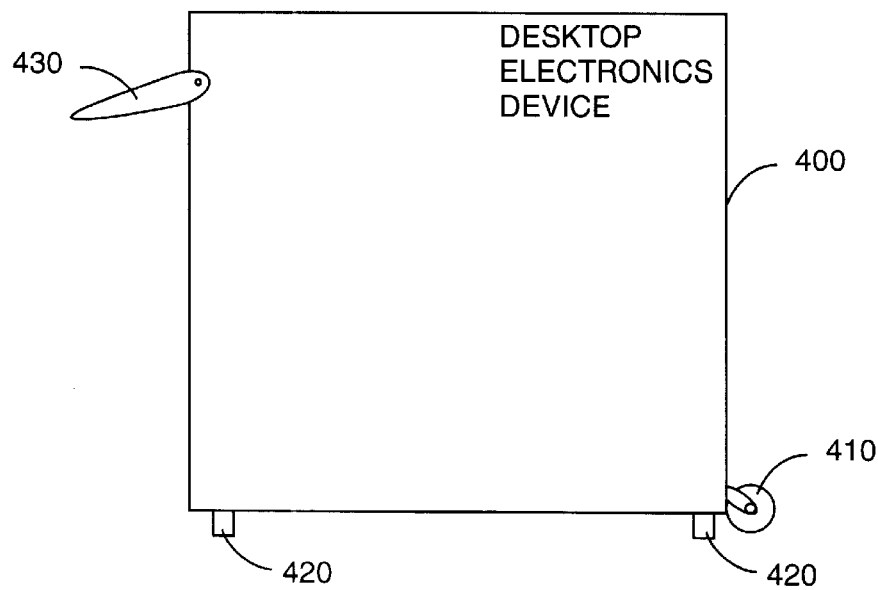
FIG. 4 is a schematic diagram of an alternate embodiment of the mobility assembly of FIG. 3C coupled to a desktop electronic device.

FIG. 4 is an illustration of another embodiment of the present invention. In this embodiment, at least one mobility assembly 410 is coupled to a desktop electronic device 400. However, unlike the previous embodiments, a plurality of feet 420 support the desktop electronic device 400 while the desktop electronic device 400 is not being translated across the desktop on the mobility assembly 410 by the deskworker. The deskworker may utilize a handle 430 to tilt the desktop electronic device 400 onto the mobility assembly(s) 410 and roll the desktop electronic device 400 across the desktop. The mobility assembly(s) 410 comprise at least one revolving element that may be a cylinder, sphere, or tire-shaped. The mobility assembly(s) 410 may be connected to the desktop electronic device 400, as shown, or higher up on the side. Note that this configuration is not as gentle as the configuration shown in FIG. 3A for the desktop electronic device 400 or as safe for the deskworker during movement of the desktop electronic device. In an alternate embodiment, a plurality of mobility assemblies 410 are coupled to the desktop electronic device 400 and support it even while at rest.

Figure 5A:
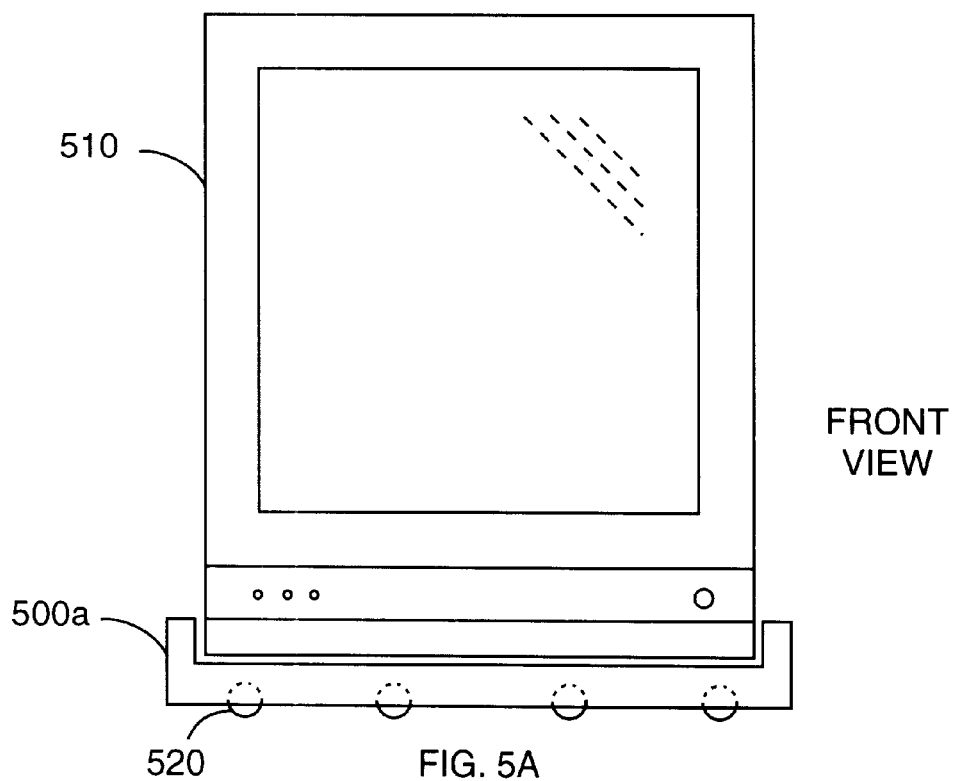
FIG. 5A is a schematic diagram of an apparatus comprising plural mobility assemblies of FIG. 3C that may be employed in FIG. 2.

FIG. 5A shows a front view of another embodiment of the present invention. An apparatus or platform 500*a*, separate from the desktop electronic device 510, comprises mobility assemblies 520. The platform 500*a* is designed to be separate from the desktop electronic device 510 (i.e., not part of an originally manufactured desktop electronic device 510). The platform 500*a* can be shaped to "form-fit" the base of a desktop electronic device 510, as shown, or can be sized, more generically, to support a desktop electronic device over a wide range of sizes and shapes. Though the mobility assemblies 520 are shown to be coupled to the bottom of the platform 500*a*, it should be understood that the embodiment of FIG. 4 could alternatively be employed.

Figure 5B:
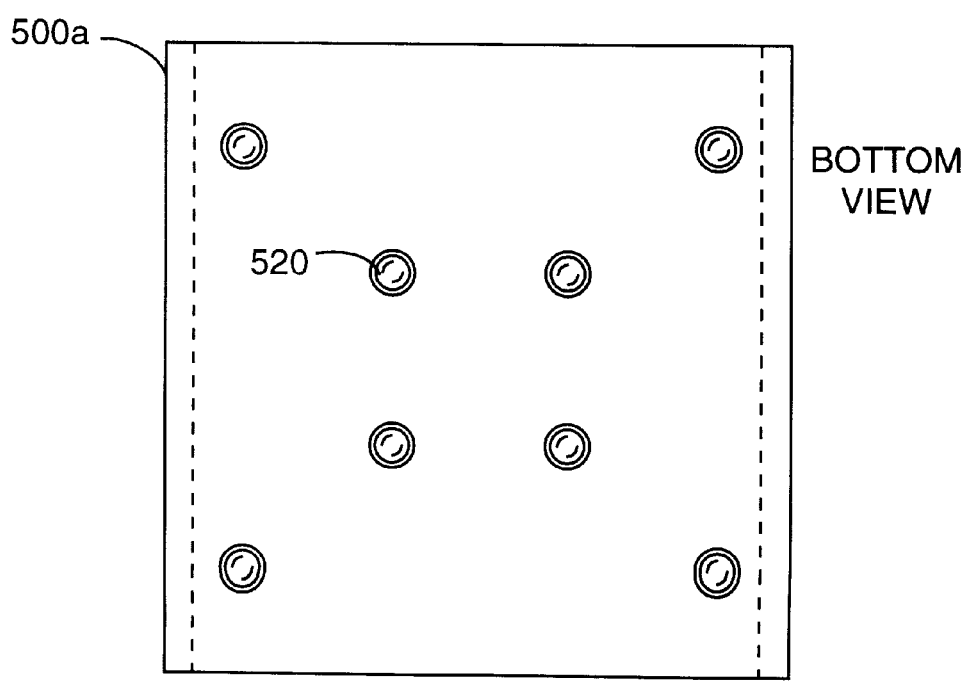
FIG. 5B is a bottom view, pictorial diagram of the apparatus of FIG. 5A.

FIG. 5B shows a bottom view of the platform 500*a* having a plurality of mobility assemblies 520 connected to the platform 500*a* according to the principles of the present invention. The platform 500*a*, having the mobility assemblies 520, may be connected to the bottom of the desktop electronic device 510. Although separate from the desktop electronic device 510, the platform 500*a* provides the same functionality (of providing desktop mobility for the desktop electronic device 510) as the embodiment with the mobility assemblies 520 being connected directly to the desktop electronic device 510 (see, for example, FIG. 3A).

Figure 6:
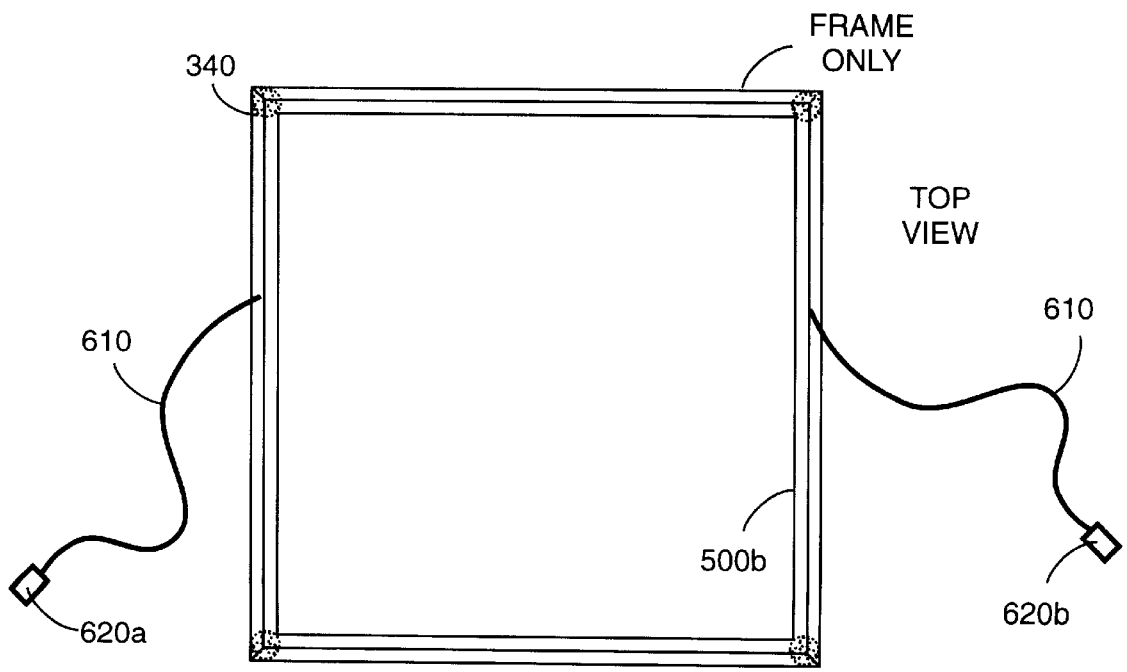
FIG 6 is a schematic diagram of an alternate embodiment of the apparatus of FIG. 5A.

FIG. 6 is a top view of another embodiment of the present invention in which a platform 500*b* has only a frame (i.e., the center of the frame is empty, therefore lighter and less expensive to manufacture). The platform 500*b*, may form-fit the base of a desktop electronic device. To prevent the desktop electronic device from falling off the platform 500*b* during a move, the platform 500*b* has straps 610. On a first end, each strap 610 is coupled to the platform 500*b*; on a second end, each strap 610 includes a clip 620*a*, 620*b*, where the clips 620*a* and 620*b* may be designed to be connected together or may be designed to couple to the platform or just to the desktop electronic device. The straps 610 may be stretchable or non-stretchable. Alternatively, a material such as foam rubber or Velcro may be employed to improve the coupling between the desktop electronic device and the platform 500*b*. The material is attached (not shown) to locations on the platform 600*b* where the desktop electronic device contacts the platform. In the case of a two-part material, such as Velcro, one part is attached to the platform 500*b* and the second part is attached to the desktop electronic device. Alternatively, other securing mechanisms may be used to secure the desktop electronic device to the platform 500*b*, including screws, gaskets, clamps, pins, and snaps.

Figure 7:
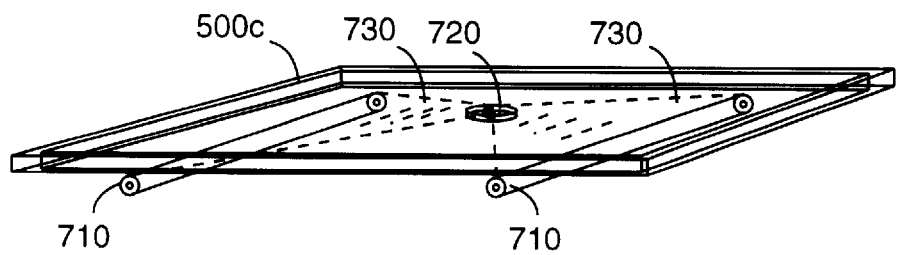
FIG. 7 is a schematic diagram of an embodiment of yet another embodiment of the apparatus of FIG. 5A having cylindrical rollers for single axis translation.

FIG. 7 is a schematic diagram of an alternate embodiment of the platform 500c. The two rollers 710 are connected to the platform 500c via a swivel 720, which allows the platform 500c to rotate. The rollers 710 allow the platform 500c to be moved in a linear manner across the desktop. It should be understood that the number of rollers 710 coupled to the platform 500c can range from one to as many that will fit across the bottom of the platform 500c. Additionally, an arm or flange (not shown) may be connected to at least one of the connecting components 730 connected to the rollers 710 to provide a handle to allow a user to rotate the platform 500c beneath the desktop electronic device. The translation movement of the platform 500c is more limited by utilizing the two, parallel rollers 710 in parallel configuration than the mobility assembly 340 configuration (see, for example, FIG. 3C).

Figure 8:
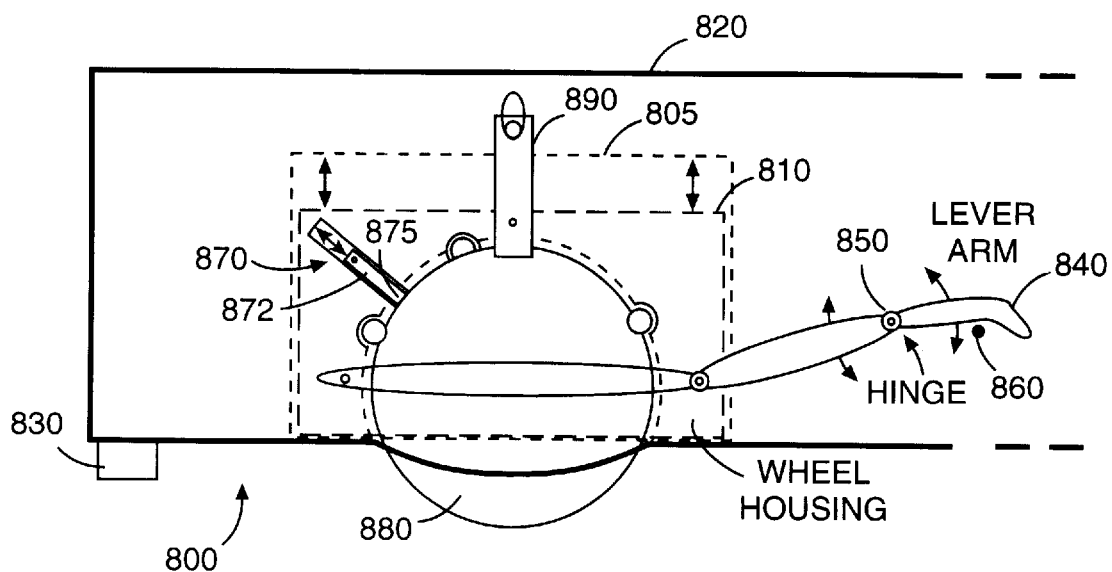
FIG. 8 is a schematic diagram of another embodiment of the mobility assembly of FIG. 3C having a mechanism for disengaging the mobility assembly from the desktop.

FIG. 8 is a schematic diagram of an alternate embodiment of a mobility assembly 800. A platform 820 defines a slot 805 into which a housing 810 composing part of the mobility assembly 800 resides. The housing 810 is separate from the platform 820 so that the mobility assembly 800 can be engaged and disengaged (i.e., set to support the desktop electronic device on the desktop or recessed from the desktop) so that the desktop electronic device can be supported by feet 830. Disengaging the mobility assembly 800 eliminates the possibility for the desktop electronic device to roll off the desktop by incidental contact.

To engage and disengage the mobility assembly 800 to/from supporting the desktop electronic device, a deskworker operates a lever arm 840. The lever arm 840 is coupled to the housing 810 of the mobility assembly 800. The lever arm 840 rotates about a hinge 850. A peg 860 fixedly coupled to the platform 820 secures the lever arm 840 in either the engaged or disengaged position. A spring-clip latching mechanism 890 may also be used to lock the mobility assembly in the disengaged position. It should be understood that other engaging and disengaging mechanisms may be used to toggle between having the feet 850 or the mobility assembly 800 support the desktop electronic device.

Additionally, the feet 850 may have an engaging or disengaging mechanism to lower and raise the feet to support the desktop electronic device on the platform. Alternatively, an electromechanical device (not shown), such as a worm gear coupled to a motor, may be used to engage and disengage the mobility assembly 800 or the feet 850; simple hand-activated screw mechanism may be used in place of the motor-worm gear mechanism. Yet another embodiment includes stopper arms having rubber tipped ends (not shown) that press against the desktop with enough force to provide resistance for the desktop electronic device to be prevented from being moved by incidental contact by the deskworker. Finally, a locking mechanism 870 may include a peg 872 having a rubber tip 875 that can be selectively applied to a primary revolving member 880 so that the platform 820 is prevented from moving due to incidental contact by the deskworker.

It should be understood that an engaging or disengaging mechanism for the mobility assembly 800 or feet 850 could also be applied to the desktop electronic device by the desktop electronic device manufacturer. A shock absorption mechanism (not shown), such as springs or dashpots, may also be included between the mobility assembly 800 and the platform 820 so as to provide additional protection for the desktop electronic device during movement.

Figure 9:
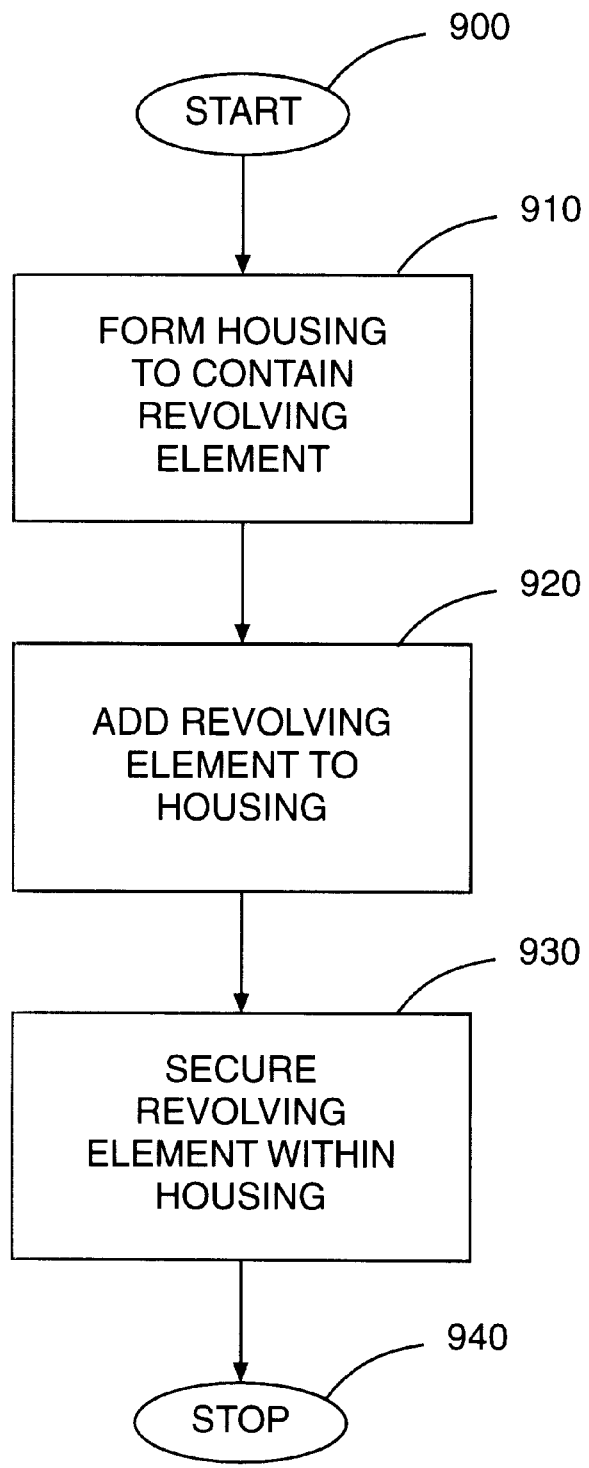
FIG. 9 is a representative flow diagram of a method for forming the mobility assembly apparatus of FIG. 3C.

FIG. 9 is a flow diagram of a method for forming a revolving member according to the principles of the present invention. The method starts in step 900. In step 910, a housing (e.g., 340 or 810) to contain revolving elements (e.g., 370 and 380) is formed. The housing may be formed through plastic molding or die casting techniques, for example. The revolving elements, which may comprise several spherical and/or cylindrical elements, are added to the housing formed in step 920. In step 930, the revolving elements are secured within the housing. For example, a retainer ring may be secured using a technique as herein previously described. Once the revolving elements are secured in step 930, the method is completed in step 940.

The previous description is of a preferred embodiment for implementing the invention, and the scope of the invention should not necessarily be limited by this description. The scope of the present invention is instead defined by the following claims.

What is claimed is:

1. An apparatus for providing desktop mobility to a desktop electronic device, said apparatus comprising:
   at least one mobility assembly having a primary, spherically shaped, revolving member and at least three secondary revolving members in contact with the primary revolving member, said at least one mobility assembly providing mobility for said desktop electronic device to translate from a first position to a second position on a desktop.

2. The apparatus according to claim 1, wherein said desktop electronic device comprises at least one of the following: a display device, a computing device, or a keyboard device.

3. The apparatus according to claim 1, further comprising:
   a plurality of feet for supporting said desktop electronic device; and
   means for engaging and disengaging said plurality of feet to said desktop.

4. The apparatus according to claim 1, wherein the at least three secondary revolving members are spherically shaped.

5. The apparatus according to claim 1, wherein said primary revolving member resides in a primary cavity and said secondary revolving members reside in at least one secondary cavity.

6. The apparatus according to claim 1, wherein said at least one mobility assembly comprises a locking mechanism.

7. The apparatus according to claim 6, wherein said locking mechanism is selectably contacted with at least one revolving member to lock said at least one revolving member.

8. The apparatus according to claim 1, wherein at least one revolving member comprises at least one of the following materials: plastic, Teflon, rubber, or metal.

9. The apparatus according to claim 1, wherein the secondary revolving members are cylindrically shaped.

10. The apparatus according to claim 1, further comprising means for engaging and disengaging said at least one mobility assembly.

11. An apparatus, comprising:
    a platform for supporting a desktop electronic device on a desktop;
    at least one mobility assembly, having at least one revolving member, coupled to said platform to provide said platform mobility on the desktop;
    a plurality of feet further coupled to said platform; and
    means for engaging and disengaging said plurality of feet to and from, respectively, said desktop.

12. The apparatus according to claim 11, wherein the at least one revolving member includes at least one of the following shapes: spherical and cylindrical.

13. The apparatus according to claim 11, wherein the at least one revolving member includes a primary revolving member and at least three secondary revolving members.

14. The apparatus according to claim 13, wherein the primary revolving member resides in a primary cavity and the secondary revolving members reside in at least one secondary cavity.

15. An apparatus, comprising:
a platform for supporting a desktop electronic device on a desktop; and
at least one mobility assembly, having a primary, spherically shaped, revolving member and at least three secondary revolving members in contact with the primary revolving member, said at least one mobility assembly coupled to said platform to provide said platform mobility on said desktop.

16. The apparatus according to claim 15, further comprising means for securing said desktop electronic device to said platform.

17. The apparatus according to claim 16, wherein said means for securing said desktop electronic device to said platform include at least one of the following: a strap, Velcro, or adhesive.

18. The apparatus according to claim 15, wherein said desktop electronic device comprises at least one of the following: a display device, a computing device, or a keyboard device.

19. The apparatus according to claim 15, further comprising:
a plurality of feet coupled to said platform; and
means for engaging and disengaging said plurality of feet to and from, respectively, said desktop.

20. The apparatus according to claim 15, wherein the at least three secondary revolving members are spherically shaped.

21. The apparatus according to claim 15, wherein said primary revolving member resides in a primary cavity and said secondary revolving members reside in at least one secondary cavity.

22. The apparatus according to claim 15, wherein the secondary revolving members are cylindrically shaped.

23. The apparatus according to claim 15, further comprising means for engaging and disengaging said at least one mobility assembly.

24. The apparatus according to claim 15, wherein at least one revolving member comprises at least one of the following materials: plastic, Teflon, rubber, or metal.

25. The apparatus according to claim 15, wherein said at least one mobility assembly comprises a locking mechanism.

26. The apparatus according to claim 25, wherein said locking mechanism is selectably contacted with at least one revolving member to lock the at least one revolving member.

27. A method for making a mobility assembly comprising the steps of:
forming a housing defining a primary cavity and at least one secondary cavity;
placing at least three secondary revolving members into said at least one secondary cavity;
placing a primary revolving member into said primary cavity; and
securing said revolving members into said cavities.

28. The method according to claim 27, wherein said at least one revolving member is spherical.

29. The method according to claim 27, wherein each of said cavities is essentially spherical.

30. An apparatus, comprising:
a desktop electronic device; and
at least one mobility assembly coupled to said desktop electronic device having a primary, spherically shaped, revolving member and at least three secondary revolving members in contact with the primary revolving member, said at least one mobility assembly providing mobility for said desktop electronic device to translate from a first position to a second position on a desktop.

31. An apparatus for providing mobility, said apparatus comprising:
a housing defining a primary cavity and at least one secondary cavity;
a primary revolving member located within said primary cavity and at least three secondary revolving members located within said at least one secondary cavity extending from said primary cavity, wherein said at least three secondary revolving members contact said primary revolving member.

32. The apparatus according to claim 31, wherein the secondary revolving members are spherical.

33. The apparatus according to claim 32, wherein said primary revolving member is larger in diameter than said at least three secondary revolving members.

34. The apparatus according to claim 31, wherein at least one revolving member is cylindrical.

35. The apparatus according to claim 31, wherein said primary revolving member comprises a rubber surface.

36. The apparatus according to claim 31, wherein said secondary revolving members are composed of a material having low coefficient of friction.

37. The apparatus according to claim 36, wherein said at least one secondary cavity has a surface providing a low coefficient of friction.

38. An apparatus for providing desktop mobility for a desktop electronic device, comprising:
primary revolving means; and
secondary revolving means in contact with said primary revolving means for translating the desktop electronic device from a first position to a second position on a desktop.

39. An apparatus, comprising:
means for supporting a desktop electronic device; and
means for providing desktop mobility for said means for supporting said desktop electronic device, said means for providing desktop mobility including primary revolving means and secondary revolving means in contact therewith.

40. An apparatus, comprising:
a desktop electronic device;
at least one mobility assembly coupled to said desktop electronic device, said at least one mobility assembly comprising at least one revolving member providing mobility for said desktop electronic device to translate from a first position to a second position on a desktop;
a plurality of feet for supporting said desktop electronic device; and
means for engaging and disengaging said plurality of feet to said desktop.

41. The apparatus according to claim 40, wherein the at least one revolving member includes at least one of the following shapes: spherical and cylindrical.

42. The apparatus according to claim 40, wherein the at least one revolving member comprises at least one of the following materials: plastic, Teflon, rubber, or metal.

43. The apparatus according to claim 40, wherein the at least one revolving member includes a primary revolving member and at least three secondary revolving members.

44. The apparatus according to claim 43, wherein the primary revolving member resides in a primary cavity and the secondary revolving members reside in at least one secondary cavity.

* * * * *